3,389,491
DEVICE FOR HOLDING A FISH, ESPECIALLY FOR USE IN CONNECTION WITH ICE FISHING
Walter E. Lowrey, 1940 W. Ontario Ave.,
Dayton, Ohio 45414
Filed July 25, 1966, Ser. No. 567,593
9 Claims. (Cl. 43—53.5)

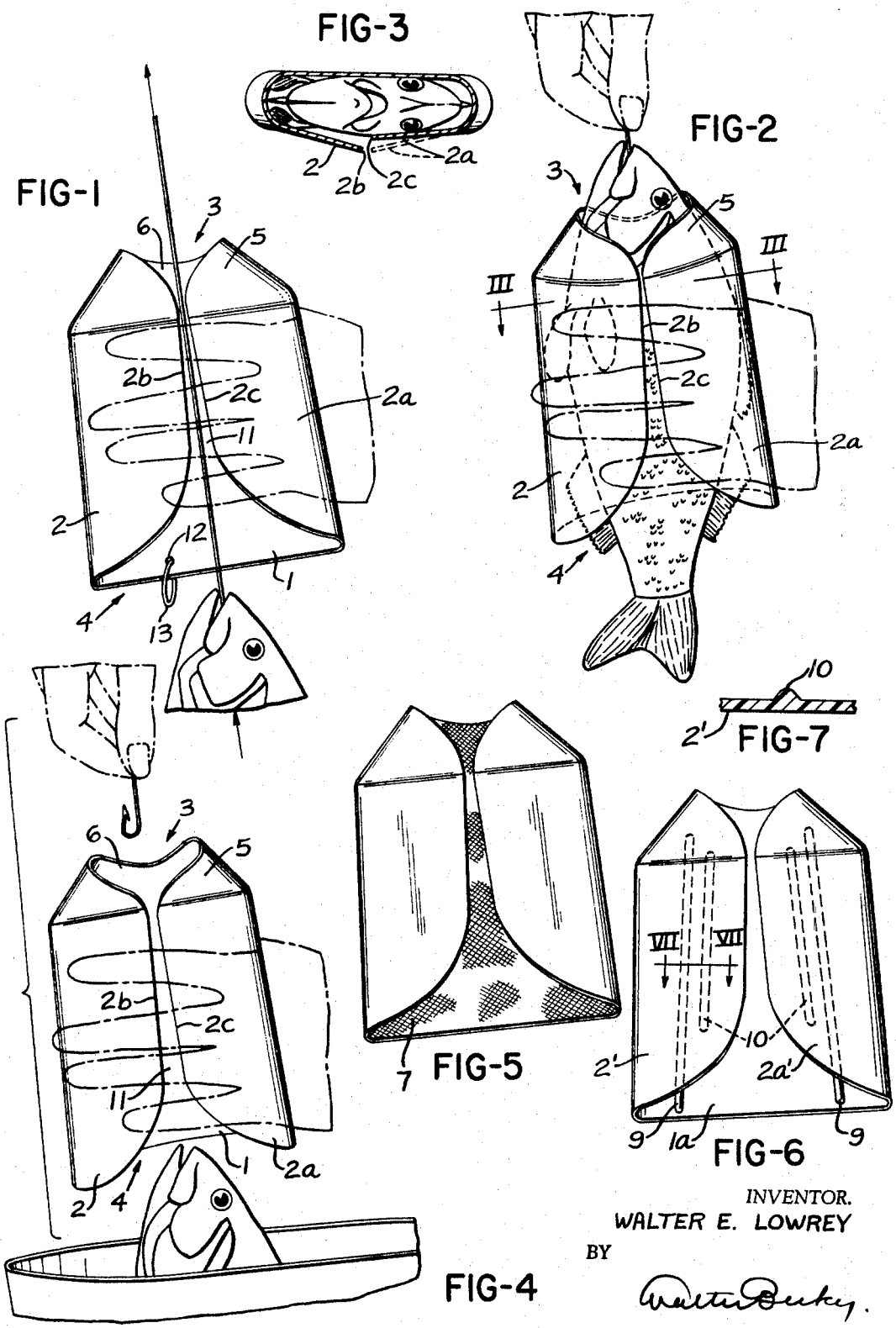

ABSTRACT OF THE DISCLOSURE

A fish holder in the form of a flat channel of approximately oval cross-section having an approximately plane surface bottom and having oppositely located thereto bendable resilient top sections defining with each other a slot extending from one end to the other end of said fish holder. The front end of said fish holder is formed by a forwardly tapering head section adapted to permit a portion of a head of a fish to pass therethrough.

---

The present invention relates to fishing and, more specifically, concerns equipment for handling a fish after it has been pulled out of the water. In particular, when ice fishing is involved, it has heretofore always been a problem to hold the cold fish with one hand, which normally is also very cold, in order to be able with the other hand to remove the hook from the mouth of the fish prior to releasing the fish into a bucket or other container. Due to the fact that the fish is extremely cold when ice fishing and that, as a rule, also the fisherman's hand is very cold, the fish has the tendency to slip in the fisherman's hand and frequently it drops several times to the ground before the hook is finally removed.

It is, therefore, an object of the present invention to provide a device which will overcome the above mentioned difficulties.

It is another object of this invention to provide a device which will not feel cold in the fisherman's hand and which can be held by the same while being able to receive the cold fish and hold the same during the removal of the hook.

These and other objects and advantages of the invention will appear more clearly from the following specification in connection with the accompanying drawing, in which:

FIG. 1 illustrates the device according to the present invention at the time it is about to receive the fish on the hook.

FIG. 2 shows the fish as fully pulled into the device according to the invention.

FIG. 3 is a section taken along the line III—III of FIG. 2 but shows one of the flaps bent inwardly from the dash line position for getting a firm grip on the fish.

FIG. 4 shows the device according to the invention in its releasing position so that the fish will slip into the bucket without being touched by hand.

FIG. 5 shows a slight modification of the device of FIG. 1 inasmuch as the inside of the device is knurled to provided for a better grip on the fish.

FIG. 6 represents a further modification of the present invention which differs from the devices of FIGS. 1 and 5 in that a rib is provided on each flap and that two ribs are provided at the bottom of the device.

FIG. 7 is a section taken along the line VII—VII of FIG. 6.

The device according to the present invention is characterized primarily in that it forms a receiving container having a bottom portion and two upwardly bent flexible flaps of sufficient stiffness so as to form with said bottom portion a self-supporting container which at the rear end has an opening corresponding to the greatest height of the fish to be received in said container, while the front portion of said container has an opening just sufficient to permit at least the major portion of the mouth of the fish to protrude from the container. The upwardly bent flaps define a gap therebetween which permit the passage of the fishing line therethrough when the fish is being pulled from the water into the container.

Referring now more specifically to the drawing, the receiving device or container shown therein comprises a bottom 1 and two side flaps 2, 2a which are folded toward each other so as to define with the bottom 1 a relatively flat container. The edges 2b and 2c which represent the inner edges of the flaps 2 and 2a facing each other define therebetween a gap 11 of sufficient width to permit the passage of the fishing line from the top toward the bottom 1. Preferably, the edges 2b and 2c taper toward the front portion 3 of the container. While, as will be evident from the drawing, the rear portion 4 of the container defines an opening the width of which corresponds to the greatest height of the fish to be received in said container, the front portion 3 of said container has an opening 6 just sufficient to permit a portion of the mouth of the fish to stick out therethrough when the fish is fully received in said container as illustrated in FIG. 2. Preferably, the front portion 3 of the container as partly defined by the bottom and partly by the flaps is tapered to form an approximately frusto-conical head 5 in conformity with the head portion and the adjacent portion of the fish.

The container itself may be made of any suitable flexible material which is stiff enough to be self-supporting so as to form the hollow container shown in the drawing. Thus, the container may consist of any suitable plastic material, as for instance polyurethane, or of relatively hard rubber material. If desired, the container may be made of flexible glass fiber material or of a very thin flexible metal covered on the inside and outside by a rubber material. The flexible portion of the container must, of course, be resilient so as to return to its original shape when pressure thereon is relieved.

The important feature of the invention consists in that the flaps 2, 2a are sufficiently easily flexible so as to be bent inwardly by the fingers of the fisherman's hand when the fish has been fully received in the container to thereby firmly hold the fish in said container. The friction between the container and the fish can be increased by knurling the inside of the container, i.e. the inside of the bottom as well as of the flaps, as shown in FIG. 5 and designated with the reference numeral 7. According to another modification of the invention, the bottom 1a (FIG. 6) may be provided with two longitudinal ribs 9 while the inside of the flaps 2', 2a' may each be provided with a longitudinal rib 10 as shown in FIG. 7.

The handling of the device according to the present invention is extremely simple. It may be assumed that the fisherman has hooked a fish and is about to grasp the fish to remove the hook. The fisherman will then hold the device according to the invention with one hand in the position shown in FIG. 1 so that the fishing line will be approximately in alignment with the gap 11 (FIG. 1). The fisherman then pulles with his other hand the line in the direction of the uppermost arrow thereby pulling the fish up into the position shown in FIG. 2. When the fish has reached the position shown in FIG. 2, the fisherman presses with the fingers of the hand holding the device one of the flaps toward the fish so as to firmly clamp the fish into the device. Preferably, he will at this time turn the device so that the front opening 6 is directed downwardly so that the fish by its own weight is held in the container and cannot slip out. Having now a firm grasp on the fish in the container, the fisherman can easily remove the hook. As soon as this has been accomplished, he turns the device into FIG. 4 position and releases the pressure on the respective flap 2 or 2a while holding the device over the bucket or vessel which eventually receives the fish. The fish will then by its own weight slip into the bucket, while the flap 2 will due to its resiliency, return to its original position.

It will be appreciated that throughout the entire operation the fisherman did not have to touch the cold slippery fish with his hands or get his hand wet.

It is, of course, to be understood that the present invention is, by no means, limited to the particular shape of the device shown in the drawing but also comprises any modifications within the scope of the appended claims.

It is also to be understood that the device according to the present invention can be made in different sizes to correspond to different sizes of fish and also can be made to correspond to different shapes of fish and that, as a rule, a fisherman will have a plurality of such devices with him to accommodate different sizes and types of fish. To this end, the device according to the present invention may be provided with a hole 12 through which a ring 13 may be slipped so that the fisherman can hook the device onto a belt or the like.

While the device according to the present invention is of particular usefulness in connection with ice fishing, it is, by no means, limited thereto.

What I claim is:

1. A fish holder which comprises: a main channel portion composed of a single-one piece sheet of resilient flexible material which has an approximately plane bottom section and has its outer side portions folded toward each other so that the free edges of said side portions face each other and with each other define a slot for a fish line while said side portions are connected to said bottom section by curved wall sections, said main channel portion being self-sustaining so as to form a channel member of substantially oval cross-section open at both ends, said folded-over side portions forming bendable resilient approximately plane surface sections, and an approximately frusto-conical slotted head channel member connected at its larger end to said main channel portion and forming a continuation of said main channel portion, said head channel member being open at its outer smaller end, the slot in said head member defining a passage for the fish line, said last-mentioned slot merging with the first-mentioned slot at the inner end of said head member so that the slot in said main channel portion is continued through said head channel member up to said outer end opening, said outer end opening defining a passage for a portion of the head of a fish in said fish holder.

2. A fish holder according to claim 1, in which said main channel portion and said head channel member together consist of a single one-piece sheet of plastic material.

3. A fish holder according to claim 1, in which the fish line slot in said main channel portion flares in the direction away from said head channel member.

4. A fish holder according to claim 2, in which said main channel portion and said head channel member consist of polyurethane.

5. A fish holder according to claim 1, in which at least a portion of the inside of said main channel portion is provided with ribs.

6. A device according to claim 1, in which said main channel portion and said head channel member consists of glass fiber material.

7. A device according to claim 1, in which said main channel portion and said head channel member consists of resilient sheet metal covered by rubber material.

8. A device according to claim 1, in which said main channel portion and said head channel member consists of resilient hard rubber.

9. A dveice according to claim 1, in which at least a portion of the inside of said device is knurled.

References Cited

UNITED STATES PATENTS

| Re. 21,375 | 2/1940 | Tillinghast | 43—53.5 |
| 1,438,091 | 12/1922 | Bowe | 17—8 |
| 2,263,965 | 11/1941 | Fiori. | |
| 3,081,576 | 3/1963 | Collins | 43—53.5 |
| 2,547,592 | 4/1951 | Morris | 43—53.5 |
| 3,236,553 | 2/1966 | Shrier | 43—4 X |

FOREIGN PATENTS 60,401    1/1939    Norway.

SAMUEL KOREN, *Primary Examiner.*

J. H. CZERWONKY, *Assistant Examiner.*